Dec. 19, 1967     H. ZIRNGIBL ET AL     3,359,065
PROCESS FOR THE PRODUCTION OF TITANIUM TETRACHLORIDE
Filed April 14, 1964
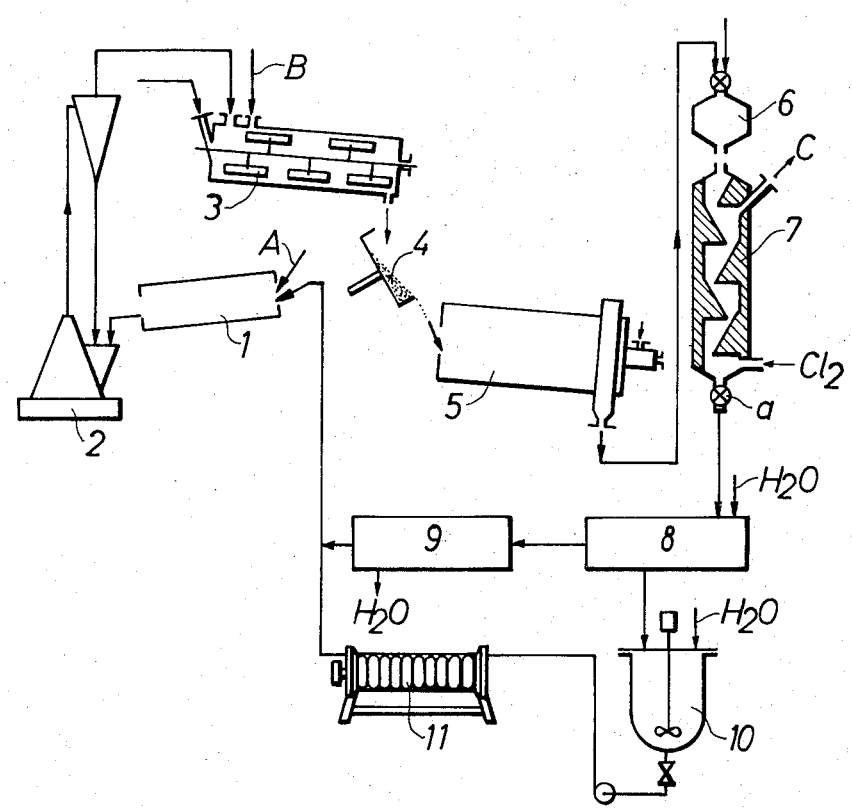
INVENTOR.
HANS ZIRNGIBL, JAKOB RADEMACHERS.
BY
Burgess, Dinklage & Sprung
ATTORNEYS United States Patent Office 3,359,065
Patented Dec. 19, 1967

3,359,065
PROCESS FOR THE PRODUCTION OF
TITANIUM TETRACHLORIDE
Hans Zirngibl, Duisburg, and Jakob Rademachers, Krefeld, Germany, assignors to Farbenfabriken Bayer Aktiengesellschaft, Leverkusen, Germany, a German corporation
Filed Apr. 14, 1964, Ser. No. 359,709
Claims priority, application Germany, Apr. 24, 1963,
F 39,562
8 Claims. (Cl. 23—87)

ABSTRACT OF THE DISCLOSURE

Production of titanium tetrachloride from oxygenic titanium-containing materials by counterflow chlorination of coked granules having a diameter of about 2–30 mm., formed from such oxygenic titanium-containing material, coke, binder and cokable carbonaceous material and in which the carbon component of the cokable material is present in at least the stoichiometrical quantity required for conversion of the titanium dioxide but at most 50% by weight of the total carbon content, with upwardly passing chlorine gas at a temperature of about 600–1000° C. in a shaft furnace having inclined surfaces which guide the granules through the furnace in thin layers, such that the titanium tetrachloride produced is collected from the top of the furnace and the resulting solid residue containing excess coke is collected from the bottom of the furnace.

The present invention relates to a process for the production of titanium tetrachloride by reacting oxygenic titanium-containing starting materials with chlorine.

More specifically the present invention relates to a process for the production of titanium tetrachloride by chlorination of titanium oxide-containing materials such as titanium ores, slags and the like, agglomerated with carbonaceous materials in a shaft furnace.

The formation of titanium tetrachloride from gaseous chlorine, titanium dioxide and coal at temperatures of between 500 and 1250° C. is known.

For chlorination in shaft furnaces moulded castings—briquettes—are produced from titanium dioxide-containing starting material using carbon-containing reducing agents and binders, and using normal shaft furnaces. An excess of carbon containing materials is also generally employed; in particular, in one case (British patent specification 768,867) a very large excess is used in order to obtain in the chlorination process stable castings that are bonded by the formation of coke, thereby facilitating the process in the shaft furnace. The coke framework remaining in the course of the reaction also takes up molten chlorides which would otherwise give rise to sticking and clogging. The use of binders such as sulfite waste liquor, coal tar pitch and the like and the use of additives which can be coked to form active charcoal, for example sawdust, is also known.

The disadvantages of all the hitherto known chlorinating processes in shaft furnaces are (1) the necessity to use briquettes which are alone, sufficiently stable in the ordinary shaft furnaces,
(2) the reduction in reaction velocity due to the long diffusion paths in the briquette,
(3) the known poor gas distribution in furnaces used for large technical processes, wherein a large free shaft contains relatively coarse materials,
(4) the high pressure required for introducing the gases.

The present invention relates to a process for the production of titanium tetrachloride from titanium-containing materials which are moulded with an excess of carbonaceous materials and binders and coked with reducing gases in distilling furnaces at temperatures of between about 700 and 900° C., by counter flow chlorination in shaft furnaces at temperatures of between about 600 to 1000° C., wherein the process comprises forming granules of the titanium-containing material with the addition of excess coke from a previous reaction and of cokable materials and binders, said granules being applied to counter flow chlorination after coking, whereby said granules are fed through the shaft furnace in thin layers in a curved or zigzag path.

The titanium-containing materials used may be, for example, rutile, slag which contains titanium dioxide, ilmenite or a crude titanium dioxide enriched with ores.

The granules are advantageously produced from excess coke and cokable constituents such as coal, coal tar pitch, sawdust, with the addition of binders such as sulfite waste liquor or coal tar pitch. In a preferred method of carrying out the process, the carbon component of the cokable material should be present at least in the stoichiometrical quantity required for the conversion of titanium dioxide but at the most 50% and preferably 15 to 25 of the total carbon content. The total amount of carbon in the granules referred to $TiO_2$ therefore amounts to 50 to 200%.

The shaft furnace used according to the invention contains inclined surfaces, for example surfaces arranged in zigzag formation, whose angle of inclination is at least equal to or greater than the angle of rest of the solid material and at the bottom end of which is arranged either a pivotable discharge flap or a Redler or sluice gate for controlling the throughput.

The titanium dioxide-containing raw material together with the coke, which is added as excess and which has been obtained as a residue in the chlorination process and which is first freed from chloride by washing and filtration and is dried and ground before being added to the raw material, are mixed with the fresh cokable material to be used, for example sawdust, coal dust and the like, and formed into granules of 2 to 30 mm., preferably 2 to 10 or 3 to 10 mm. diameter with sulfite waste liquor or coal tar pitch by means of the usual granulation apparatus, e.g. a dish granulator.

These granules are coked in an ordinary low temperature carbonizing furnace, for example a rotary furnace with reducing gases, e.g. oil gas, at 700 to 900° C. and activated for chlorination. These granules while still hot are guided by means of dosing devices down a shaft furnace which, as shown in the drawing, is provided with baffles arranged in zigzag formation, and are discharged through the outlet. Chlorine gas is introduced in countercurrent thereto into the lower end of the shaft furnace. The inlet temperature of the granules should preferably not be lower than 500 to 600° C. because the chlorination process, which is exothermic, then requires no additional energy.

The granules leaving the chlorinating apparatus contain, in addition to coke, unreacted titanium dioxide and non-volatile chlorides (e.g. calcium- and magnesium chloride) from the ash of the coal or unreacted raw material. These residues are freed from water-soluble chlorides in a washing apparatus and returned to the process for the production of the crude granules.

The process described offers important advantages compared with the known process. According to the invention granulation of the raw materials is carried out instead of briquette formation. A technically much simpler means of shaping the material is thus achieved which moreover is cheaper and less liable to require maintenance. Furthermore, owing to the smaller size of the granules and greater porosity due to the coke component, a considerably greater exchange of material and hence greater speed of reaction is possible. The volume/time yield obtained with granules is several times that obtained with briquettes in a given furnace.

By means of the measures proposed, very stable granules are produced which have no tendency to stickiness and are so firm that they will withstand the pressures and frictions of a normal shaft furnace.

An apparatus well suited for the performance of the new process is described in the attached figures. At A the titanium-containing material and the washed residues—coke and unreacted $TiO_2$—are fed into a drying device 1 (e.g. a rotary furnace), ground in grinder 2 and mixed in mixer 3 (e.g. Lödige mixer) with cokable materials. At B a certain amount of the binder is added. The resultant mixture is granulated in granulator 4 (e.g. dish granulator) and coked in furnace 5 (e.g. rotating furnace). At sluice gate 6 the granules are fed into the shaft furnace 7. The $TiCl_4$ leaves the furnace at C, whereas the residue is removed from the furnace bottom via a sluice gate. The residue is washed at zone 8 (e.g. using a container with stirrer schematically shown at 10) and filtered at zone 9 (e.g. using a filter press schematically shown at 11).

The employement according to the invention of a shaft furnace provided with baffles avoids the disadvantages of normal shaft furnaces, such as high gas counterpressure, poor gas distribution and the employment of exceptionally stable briquettes or the like, but makes use of its advantages of simple technique without moving parts, optimum thermal efficiency, minimum dust formation.

The advantages of this arrangement are numerous. Owing to the low static pressure load, it is possible in such arrangements to work up granules which need not withstand high pressure or any excess pressure at all under some conditions prevailing during drying, during the reaction or during cooling. Owing to the empty spaces formed underneath the baffles due to the inclined positioning of these baffles, the gas distribution inevitably becomes very uniform and fresh gas is produced in every stage. These empty spaces also provide ideal conditions for the admixture or return of gas at any point in the furnace, so that the position of the reaction may be altered as desired or dammed up by the return of reaction gas. Thus exothermic reactions such as the present one may be adjusted to the required temperature by return flow of circulating gas. If additional heating measures are necessary, air may be added to the reaction. If desired, the cooling chamber may be controlled, for example, by a circulating gas. By employing "pressure relieved" shaft furnaces, very small granules may be used. This results in the most rapid possible exchange of materials and considerable increase in the reaction velocity. The exothermic reaction is very strongly localized. In such a furnace, the flow of material may be compared to a bend on which the granules travel downwards. The length and height of the flow of granules can be varied within certain limits by the inclination and distance of the inclined surfaces. Another important factor in this shaft furnace is that the granules are turned over from surface to surface and that they travel very uniformly through the furnace, controlled by the outlet device.

Preferably the shaft furnace has inclined surfaces arraged in zigzag formation with an angle of inclination of about 60°, whereby the surfaces have a distance of between about 5 and 50 cm.

The utilization of chlorine and the yield based on titanium dioxide are especially high with the use of this furnace.

The return of residual coke, as provided in accordance with the invention, on the one hand obviates the need of adding fresh coal each time and on the other hand renders the titanium tetrachloride yield based on the raw material practically 100%.

The process will be explained more fully in the following examples taken in connection with the drawing.

*Example 1*

72.5 parts by weight of a $TiO_2$ concentrate obtained by the decomposition of ilmenite with concentrated hydrochloric acid, which contains 98% $TiO_2$, are introduced at A and intimately mixed in a Lödige mixer 3 with 106 parts by weight of washed, dried chlorination residue which contains 3.5% $TiO_2$ and which has been ground to a grain size of 95% below 0.1 mm., and with 135 parts by weight of sawdust which has a grain size below 1 mm. and which yields 17% charcoal when coked. To avoid excessive dust formation in the subsequent granulation process, 70 parts by weight of calcium sulfite waste liquor, i.e. one third of the amount required for granulation, are introduced at B during the mixing process.

Granulation is carried out in a rotary granulating plate 4 of the usual construction by adding 140 parts by weight sulfite waste liquor (density $_4°^{20°}$ = 1.15 g./ml.)

through nozzles to this mixture with the plate at an inclination of 50° and revolving at a speed of 18 revs. per min.

The granules obtained in a grain size of 3 to 10 mm. form an angle of rest of 32°. They are continuously coked in a rotary tube 5 by burning oil gas in a less than equivalent quantity of air at 800° C., and the granules while still hot pass through a sluice gate 6 into the chlorinating furnace which is a "pressure relieved" shaft furnace 7 equipped with inclined baffles arranged in zigzag formation at an angle of 60°. Chlorine gas is continuously introduced from the bottom in counterflow to the slowly descending granules. Due to the heat of reaction produced, the temperature rises from the initial temperature of 600° C. to 900°° C. in the furnace, which has a refractory lining. The conversion of the titanium dioxide in the granules to titanium tetrachloride is 95% with a chlorine efficiency of 98%. The residue continuously discharged from the lower sluice which is still in the form of granules, is washed in 8, filtered at 9 and after the drying at 1 (3.5% $TiO_2$ content) mixed with $TiO_2$-containing material and sawdust or alternatively it may, while still moist, be dried together with the still moist raw-$TiO_2$ filter cake obtained by the decomposition of ilmenite with HCl, and then ground in 2 and mixed with sawdust at 3. $TiCl_4$ is condensed from the hot chlorination gases removed from the top of the furnace at C and carried away for purification. The washing water from the container with stirrer 10, i.e. at 8, is freed from solids by being passed through a filter press 11, i.e. at 9.

*Example 2*

75 parts by weight rutile ore containing 94.5% $TiO_2$ are used instead of 72.5 parts by weight raw-$TiO_2$. 90% conversion is achieved with a chlorination temperature of 900° C. The remaining 10% of $TiO_2$ are in the chlorination residue which is used again for new mixtures after washing and drying.

*Example 3*

Instead of using sulfite waste liquor as in Example 1, granulation is effected using 90 parts by weight of an aqueous tar pitch emulsion through nozzles. This emulsion contains 60% binder which has a coke yield of 20%. Further, only 75 parts by weight instead of 135 parts by weight of sawdust are used. The yield at a chlorination temperature of 900° C. is again 95% of the theoretical.

*Example 4*

Using granules obtained by applying 42 parts by weight sulfite waste liquor through nozzles to a mixture of 72.5 parts by weight raw-$TiO_2$ (98% $TiO_2$ content), 110 parts by weight chlorination residue (6.6% $TiO_2$ content) and 39 parts by weight gas coal (with 61% pure coke and 4.7% ash content) and 20 parts by weight powdered cell pitch, a TiCl$_4$ yield of 90% is obtained if, instead of using 100% chlorine gas, one uses a mixture of 30 volumes percent chlorine and 70 volumes percent nitrogen such as is obtained in the reaction of TiCl$_4$ with air at high temperatures. The reaction temperature rises from the original temperature of 600 to 750° C.

What is claimed is:

1. Process for the production of titanium tetrachloride from oxygenic titanium-containing materials which comprises coking at a temperature substantially between about 700 and 900° C. granules having a diameter of substantially between about 2 and 30 mm. formed from such oxygenic titanium-containing material, coke, binder and cokable carbonaceous material and in which the carbon component of such cokable material is present in at least the stoichiometrical quantity required for conversion of the titanium dioxide but at most 50% by weight of the total carbon content, the remainder of such total carbon content thereby providing an excess of carbon over that required for such conversion, subjecting the resulting coke granules to counterflow chlorination with upwardly passing chlorine gas at a temperature substantially between about 600 and 1000° C. in a shaft furnace having inclined surfaces in a zigzag path which guide such granules loosely through said furnace in thin layers, whereby said excess of carbon takes up molten chlorides formed as by-products during chlorination, and collecting the titanium tetrachloride thereby produced from the top of said shaft furnace and the resulting solid residue containing excess coke and said by-products from the bottom of said furnace.

2. Process according to claim 1 wherein said solid residue containing excess coke is washed with water to remove by-product water-soluble salts formed during the chlorination, then dried, and recycled to form fresh granules with additional titanium dioxide, binder and cokable carbonaceous material.

3. Process according to claim 2 wherein said binder is selected from the group consisting of sulfite waste liquor and coal tar pitch.

4. Process according to claim 3 wherein said granules have a diameter substantially between about 3 and 10 mm., and said cokable carbonaceous material is sawdust which is present in sufficient quantity that the carbon content thereof amounts to about 15–25% by weight of the total carbon content.

5. Process according to claim 4 wherein the total carbon content of said granules amounts to substantially between about 50 and 200% by weight based on the titanium dioxide present.

6. Process according to claim 4 wherein the inclined surfaces of said shaft furnace have a zigzag arrangement with an angle of inclination which is at least equal to the angle of rest of the granules.

7. Process according to claim 6 wherein said angle of inclination has a value of about 60°.

8. Process for the production of titanium tetrachloride from oxygenic titanium-containing materials which comprises subjecting coked granules having a diameter of about 2–30 mm., formed from such oxygenic titanium-containing material, coke, binder and cokable carbonaceous material and in which the carbon component of the cokable material is present in at least the stoichiometrical quantity required for conversion of the titanium dioxide but at most 50% by weight of the total carbon content, the remainder of such total carbon content thereby providing an excess of carbon over that required for such conversion, to counterflow chlorination with upwardly passing chlorine gas at a temperature substantially between about 600 and 1000° C. in a shaft furnace having inclined surfaces forming a zigzag path which guide such granules loosely through said furnace in thin layers, whereby said excess of carbon takes up molten chlorides formed as by-products during the chlorination, and collecting the titanium tetrachloride thereby produced from the top of said shaft furnace and the resulting solid residue containing excess coke and said by-products from the bottom of said furnace.

References Cited

UNITED STATES PATENTS

| 2,184,884 | 12/1939 | Muskat et al. | 23—87 |
| 2,184,887 | 12/1939 | Muskat et al. | 23—87 X |
| 3,010,806 | 11/1961 | Berry | 23—1 X |
| 3,190,729 | 6/1965 | Emmett et al. | 23—1 X |

FOREIGN PATENTS

| 768,867 | 2/1957 | Great Britain. |

OSCAR R. VERTIZ, *Primary Examiner.*

EDWARD STERN, *Examiner.*